United States Patent
Chou (10) Patent No.: US 8,138,804 B2
(45) Date of Patent: Mar. 20, 2012

(54) CORRELATED DOUBLE SAMPLING CIRCUIT

(75) Inventor: Kuo-Yu Chou, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 423 days.

(21) Appl. No.: 12/534,840

(22) Filed: Aug. 3, 2009

(65) Prior Publication Data

US 2010/0110248 A1 May 6, 2010

(30) Foreign Application Priority Data

Nov. 6, 2008 (TW) .............................. 97142953 A (51) Int. Cl.
*G11C 27/02* (2006.01)

(52) U.S. Cl. .............................. 327/94; 327/95; 327/96
(58) Field of Classification Search .................. None
See application file for complete search history.

(56) References Cited

U.S. PATENT DOCUMENTS

| | | | | |
|---|---|---|---|---|
| 5,703,608 A * | 12/1997 | Kuga | ............................. | 345/99 |
| 5,872,470 A * | 2/1999 | Mallinson et al. | ............... | 327/94 |
| 5,965,871 A * | 10/1999 | Zhou et al. | ................ | 250/208.1 |
| 7,427,880 B2 * | 9/2008 | Takahashi et al. | ............... | 327/94 |
| 7,907,004 B2 * | 3/2011 | Yoshizawa et al. | ............ | 327/554 |
| 2009/0219058 A1 * | 9/2009 | Ohba | ............................. | 327/94 |

* cited by examiner

*Primary Examiner* — Tuan T Lam
(74) *Attorney, Agent, or Firm* — Rabin & Berdo, P.C.

(57) ABSTRACT

A correlated double sampling (CDS) circuit for sampling first and second pixel signals, which are respectively transmitted via first and second data lines, in a pixel array. The CDS circuit includes first and second sampling circuits, an amplifier circuit and a control circuit. The control circuit controls the first sampling circuit to sample a reset level and a data level of the first pixel signal in a first sampling period, and controls the second sampling circuit to sample a reset level and a data level of the second pixel signal in a second sampling period. The control circuit controls the amplifier circuit to output the reset level and the data level of the first pixel signal in a first output period, and output the reset level and the data level of the second pixel signal in a second output period.

16 Claims, 5 Drawing Sheets

CORRELATED DOUBLE SAMPLING CIRCUIT

This application claims the benefit of Taiwan application Serial No. 97142953, filed Nov. 6, 2008, the subject matter of which is incorporated herein by reference.

BACKGROUND OF THE INVENTION

1. Field of the Invention

The invention relates in general to a correlated double sampling (CDS) circuit, and more particularly to a CDS circuit utilized to sample pixel signals transmitted via multiple data lines.

2. Description of the Related Art

In the present art, a correlated double sampling (CDS) circuit may receive a signal outputted from a pixel, sample the signal to obtain a sampled signal, and then output the sampled signal. For example, the signal outputted from the pixel includes a reset level and a data level. The CDS circuit has corresponding sampling circuits for respectively sampling the reset level and the data level of the pixel signal. The CDS circuit further includes an amplifier circuit for outputting the sampled levels obtained from the sampling circuit.

Conventionally, the number of the CDS circuits has to correspond to the size of the pixel array. For example, the 1600×1200 pixel array needs 1600 CDS circuits for respectively sampling the pixel signals transmitted via 1600 data lines. Thus, the problem of the larger circuit area occupied by the CDS circuits is caused.

SUMMARY OF THE INVENTION

The invention is directed to a correlated double sampling (CDS) circuit having the circuit structure configured such that one CDS circuit may be used to sample pixel signals transmitted via multiple data lines. Compared with the conventional CDS circuit, the CDS circuit of the invention advantageously has the smaller circuit area.

According to a first aspect of the present invention, a correlated double sampling (CDS) circuit is provided. The CDS circuit is for sampling a first pixel signal, transmitted via a first data line, and a second pixel signal, transmitted via a second data line, in a pixel array. The CDS circuit includes first and second sampling circuits, an amplifier circuit and a control circuit. The control circuit is for controlling the first sampling circuit to sample a first reset level and a first data level of the first pixel signal in a first sampling period, and for controlling the second sampling circuit to sample a second reset level and a second data level of the second pixel signal in a second sampling period. The control circuit is further for controlling the amplifier circuit to output a first sampling reset level and a first sampling data level, obtained by the first sampling circuit by way of sampling, in a first output period, and to output a second sampling reset level and a second sampling data level, obtained by the second sampling circuit by way of sampling, in a second output period.

According to a second aspect of the present invention, a correlated double sampling (CDS) circuit is provided. The CDS circuit is for sampling a first pixel signal, transmitted via a first data line, and a second pixel signal, transmitted via a second data line, in a pixel array. The CDS circuit includes an amplifier circuit, a control circuit, and first and second sampling circuits. The first sampling circuit includes first and second sampling capacitors. The second sampling circuit includes third and fourth sampling capacitors. First terminals of the first to fourth sampling capacitors receive a first reference voltage. The control circuit includes first to fourth sets of switches. The first set of switches are for respectively providing the first pixel signal, having a first reset level, and the first pixel signal, having a first data level, to second terminals of the first and second sampling capacitors in a first sampling period. The second set of switches are for respectively providing the second pixel signal, having a second reset level, and the second pixel signal, having a second data level, to second terminals of the third and fourth sampling capacitors in a second sampling period. The third set of switches are for coupling the second terminals of the first and second sampling capacitors to the amplifier circuit in a first output period, and thus outputting the first reset level, sampled by the first sampling capacitor, and outputting the first data level, sampled by the second sampling capacitor. The fourth set of switches are for coupling the second terminals of the third and fourth sampling capacitors to the amplifier circuit in a second output period, and thus outputting the second reset level, sampled by the third sampling capacitor and outputting the second data level, sampled by the fourth sampling capacitor.

According to a third aspect of the present invention, a correlated double sampling (CDS) circuit is provided. The CDS circuit is for sampling a first pixel signal, transmitted via a first data line, and a second pixel signal, transmitted via a second data line, in a pixel array. The CDS circuit includes an amplifier circuit, a control circuit and first and second sampling circuits. The first sampling circuit includes first and second sampling capacitors. The second sampling circuit includes third and fourth sampling capacitors. The control circuit includes first to fourth sets of switches. The first set of switches are for respectively providing the first pixel signal, having a first reset level, and the first pixel signal, having a first data level, to first terminals of the first and second sampling capacitors in a first sampling period. The second set of switches are for respectively providing the second pixel signal, having a second reset level, and the second pixel signal, having a second data level, to first terminals of the third and fourth sampling capacitors in a second sampling period. The third set of switches are for coupling second terminals of the first and second sampling capacitors to the amplifier circuit in a first output period, and thus outputting the first reset level, sampled by the first sampling capacitor, and outputting the first data level, sampled by the second sampling capacitor. The fourth set of switches are for coupling second terminals of the third and fourth sampling capacitors to the amplifier circuit in a second output period, and thus outputting the second reset level, sampled by the third sampling capacitor, and outputting the second data level, sampled by the fourth sampling capacitor.

The invention will become apparent from the following detailed description of the preferred but non-limiting embodiments. The following description is made with reference to the accompanying drawings.

DETAILED DESCRIPTION OF THE INVENTION

The correlated double sampling (CDS) circuit of the embodiment is to enable one CDS circuit to sample pixel signals on multiple data lines by way of timing control.

The CDS circuit of this embodiment is for sampling a first pixel signal and a second pixel signal respectively transmitted via first and second data lines in a pixel array. The CDS circuit includes a first sampling circuit, a second sampling circuit, an amplifier circuit and a control circuit. The control circuit is for controlling the first sampling circuit to sample a first reset level and a first data level of the first pixel signal in a first sampling period, and for controlling the second sampling circuit to sample a second reset level and a second data level of the second pixel signal in a second sampling period. The control circuit is further for controlling the amplifier circuit to output a first sampling reset level and a first sampling data level, obtained by the first sampling circuit by way of sampling, in a first output period, and to output a second sampling reset level and a second sampling data level, obtained by the second sampling circuit by way of sampling, in a second output period.

First Embodiment

Figure 1:
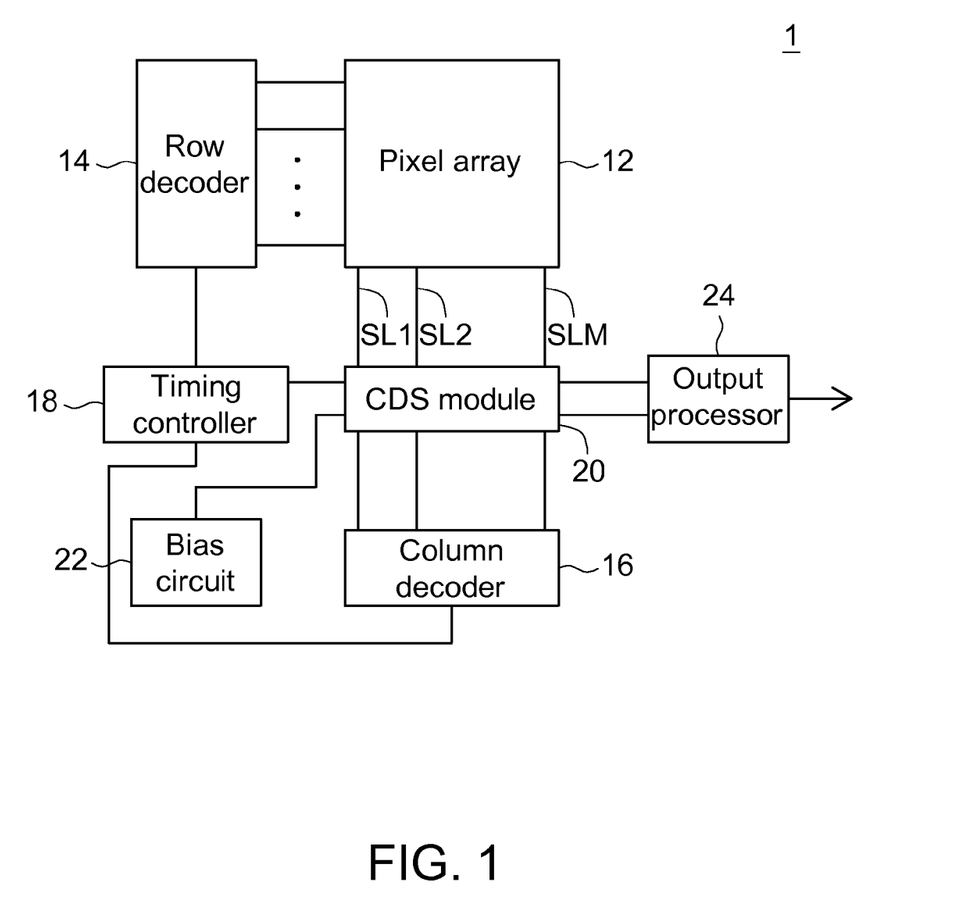
FIG. 1 is a block diagram showing an image sensor device for a correlated double sampling (CDS) circuit according to an embodiment of the invention.

FIG. 1 is a block diagram showing an image sensor device 1 for a correlated double sampling (CDS) circuit according to an embodiment of the invention. Referring to FIG. 1, the image sensor device 1 includes a pixel array 12, a row decoder 14, a column decoder 16, a timing controller 18, a CDS module 20, a bias circuit 22 and an output processor 24.

The pixel array 12 is, for example, a complementary metal oxide semiconductor (CMOS) pixel array, which has the size of M×N and is for sensing and generating a sensed image having M×N pixels, wherein M and N are natural numbers greater than 1. The pixel array 12 is controlled by the row decoder 14, the column decoder 16, the timing controller 18 and the bias circuit 22, and the sensed image generated by the pixel array 12 may be outputted via data lines SL1 to SLM, the CDS module 20 and the output processor 24.

In the embodiment, the CDS module 20 includes K CDS circuits 20_1 to 20_K for performing CDS operations on M columns of pixels in the pixel array 12, wherein K is a natural number smaller than M. In one preferred embodiment, K=M/2. That is, each of the CDS circuits 20_1 to 20_K is for detecting the pixel signal of each of the two columns of pixels.

Because the CDS circuits 20_1 to 20_K have substantially similar operations, only the CDS circuit 20_i, which samples the pixel signal P1, transmitted via the data line SLx, and the pixel signal P2, transmitted via the data line SLy, will be described as an example, wherein "i" is a natural number smaller than or equal to K, and x and y are natural numbers smaller than or equal to M. In this example, the data lines SLx and SLy are neighboring data lines.

Figure 2:
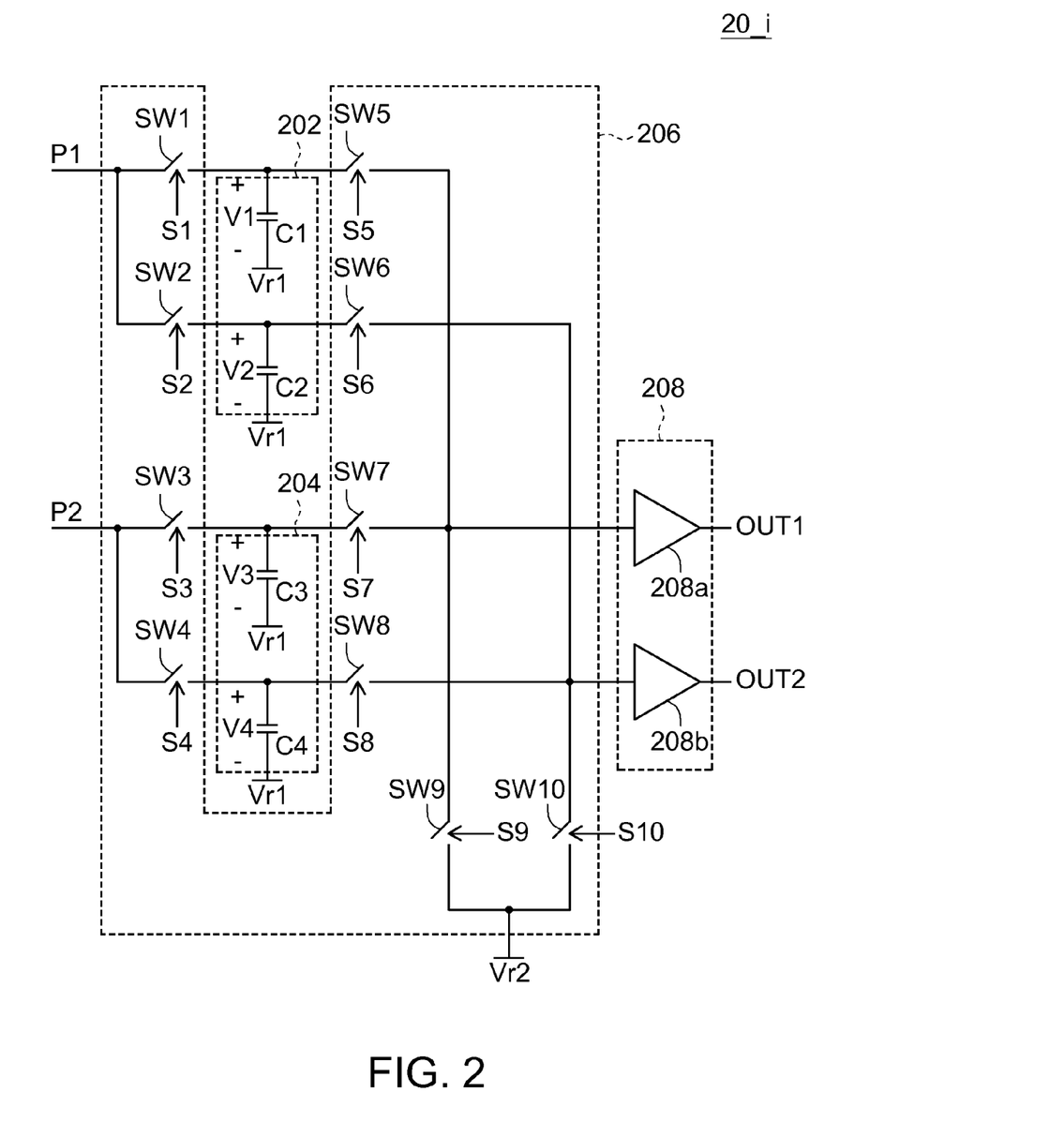
FIG. 2 is a circuit diagram showing a CDS circuit according to a first embodiment of the invention.
Figure 3:
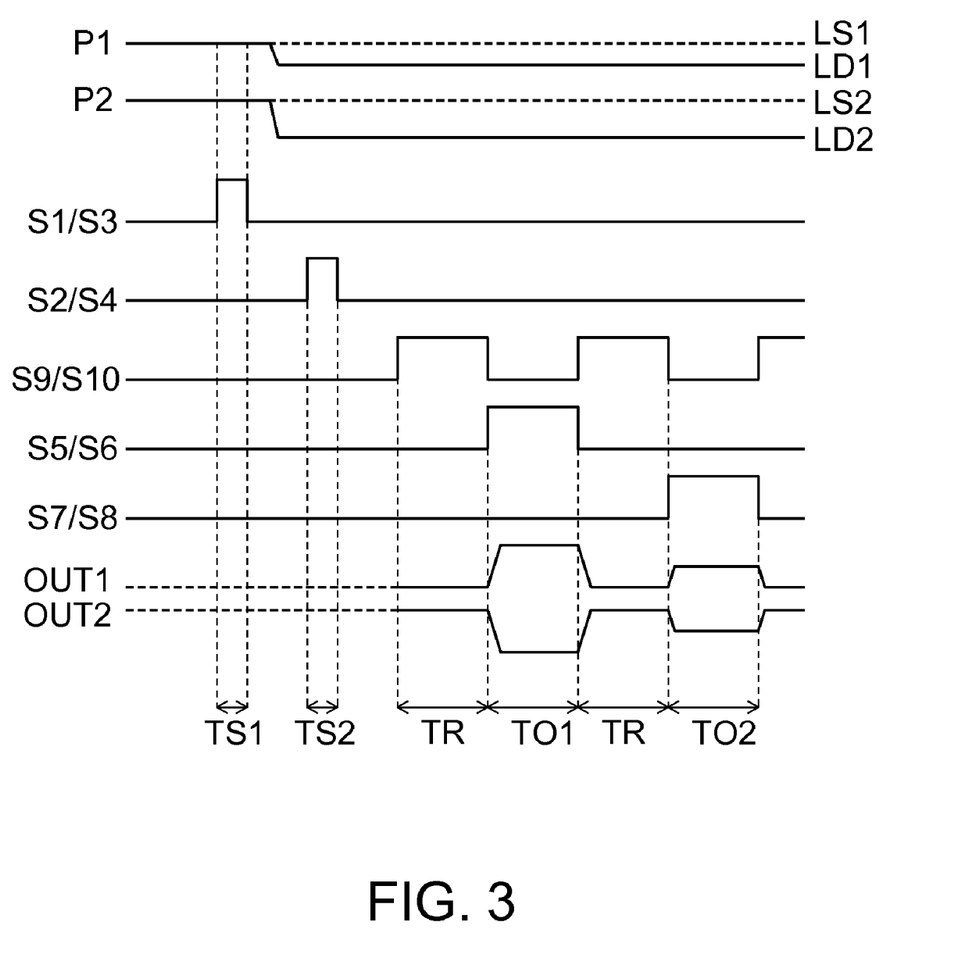
FIG. 3 shows associated signal waveforms in the CDS circuit of FIG. 2.

FIG. 2 is a circuit diagram showing the CDS circuit 20_i according to a first embodiment of the invention. FIG. 3 shows associated signal waveforms in the CDS circuit of FIG. 2. Referring to FIGS. 2 and 3, the CDS circuit 20_i includes sampling circuits 202 and 204, a control circuit 206 and an amplifier circuit 208. The sampling circuit 202 includes sampling capacitors C1 and C2, and the sampling circuit 204 includes sampling capacitors C3 and C4. First terminals of the sampling capacitors C1 to C4 receive a reference voltage Vr1, and second terminals of the sampling capacitors C1 to C4 are coupled to the control circuit 206.

The control circuit 206 includes switches SW1 and SW2. First input terminals of the switches SW1 and SW2 are respectively coupled to the sampling capacitors C1 and C2, and second input terminals of the switches SW1 and SW2 receive the pixel signal P1. The switch SW1 is controlled by a control signal S1 and turned on in a sub-sampling period TS1 to provide the pixel signal P1 to the sampling capacitor C1. At this time, the pixel signal P1 has the reset level LS1 so that the sampling capacitor C1 obtains, by way of sampling, the sampling voltage V1 between the reset level LS1 and the reference voltage Vr1. The switch SW2 is controlled by a control signal S2 and turned on in a sub-sampling period TS2 to provide the pixel signal P1 to the sampling capacitor C2. At this time, the pixel signal P1 has the data level LD1 so that the sampling capacitor C2 obtains, by way of sampling, the sampling voltage V2 between the data level LD1 and the reference voltage Vr1.

The control circuit 206 further includes switches SW3 and SW4, wherein circuit structures and operations of the switches SW3 and SW4 are similar to those of the switches SW1 and SW2 so that the switches SW3 and SW4 are respectively turned on in response to control signals S3 and S4. Thus, the sampling capacitors C3 and C4 respectively obtain, by way of sampling, the sampling voltages V3 between the reset level LS2 and the reference voltage Vr1 and the sampling voltage V4 between the data level LD2 and the reference voltage Vr1. In the embodiment, waveforms of the control signals S3 and S4 are substantially equal to waveforms of the control signals S1 and S2, and the control signals S3 and S4 are, for example, for respectively controlling the switches SW3 and SW4 to turn on in the sub-sampling periods TS1 and TS2.

The amplifier circuit 208 includes amplifiers 208a and 208b. In one embodiment, the amplifiers 208a and 208b are source follower amplifiers. In this embodiment, the amplifier circuit 208 is for performing differential amplifications on the signals received by the amplifiers 208a and 208b.

The control circuit 206 includes switches SW5 and SW6. First input terminals of the switches SW5 and SW6 are respectively coupled to the sampling capacitors C1 and C2, and second input terminals of the switches SW5 and SW6 are respectively coupled to input terminals of the amplifiers 208a and 208b. The switches SW5 and SW6 are respectively controlled by control signals S5 and S6 to turn on in the output period TO1, such that the sampling voltages V1 and V2 sampled by the sampling capacitors C1 and C2 are respectively inputted to the amplifiers 208a and 208b and the output signals OUT1 and OUT2 can be correspondingly outputted.

The control circuit 206 further includes switches SW7 and SW8, wherein circuit structures and operations of the switches SW7 and SW8 are similar to those of the switches SW5 and SW6 so that the switches SW7 and SW8 are respectively turned on in response to control signals S7 and S8 in the output period TO2. Thus, the sampling voltages V3 and V4 sampled by the sampling capacitors C3 and C4 are respectively inputted to the amplifiers 208a and 208b so that the amplifiers 208a and 208b correspondingly output the output signals OUT1 and OUT2.

The control circuit 206 further includes switches SW9 and SW10. First input terminals of the switches SW9 and SW10 are respectively coupled to the input terminals of the amplifiers 208a and 208b, and second input terminals of the switches SW9 and SW10 receive a reference voltage Vr2. The switches SW9 and SW10 are respectively controlled by control signals S9 and S10 to turn on in the reset period TR to provide the reference voltage Vr2 to the input terminals of the amplifiers 208a and 208b. Therefore, input levels of the amplifiers 208a and 208b may be reset to the reference voltage Vr2 before the output periods TO1 and TO2 are entered.

Consequently, it is possible to prevent the levels of the output signals OUT1 and OUT2, generated by the amplifiers 208a and 208b, from being influenced by the previous input signal and thus from drifting.

In addition, the signals of the input amplifiers 208a and 208b are equal to the reference voltage Vr2 in the reset period TR, and a level difference between the output signals OUT1 and OUT2 is substantially equal to an output signal offset value between the amplifiers 208a and 208b in the reset period TR. Consequently, the operator may also obtain the output signal offset value between the amplifiers 208a and 208b through the operation of the reset period TR in order to compensate for the offset value between the amplifiers 208a and 208b.

In this embodiment, only the CDS circuit 20_i, which correlatedly double samples the pixel signals P1 and P2 transmitted via the data lines SLx and SLy, is illustrated as an example. However, the operations of other CDS circuits in the CDS module 20 may also be analogized according to the operation of the CDS circuit 20_i. In this embodiment, only the condition that the data lines SLx and SLy are neighboring data lines is described as an example. However, the data lines SLx and SLy are not restricted thereto and may be the same data line. In other examples, the data lines SLx and SLy may also correspond to sub-pixels of several pixels having the same color.

In this illustrated embodiment, the number K of the CDS circuits in the CDS module 20 is substantially equal to M/2. However, the invention is not limited thereto.

In this illustrated embodiment, the CDS circuit 20_i is for detecting the pixel signals on two data lines. However, the CDS circuit 20_i of this embodiment is not limited thereto, and may further detect the pixel signals on three or more than three data lines.

The CDS circuit of this embodiment has many sampling circuits controlled by the control circuit to sample the corresponding pixel signals in the corresponding sampling periods. The CDS circuit of this embodiment further utilizes the control circuit to control the sampling circuits to respectively output the correspondingly sampled levels via the amplifier circuit in several output periods. Therefore, compared with the conventional CDS circuit, the CDS circuit according to the invention has the advantage of the smaller circuit area.

Second Embodiment

Figure 4:
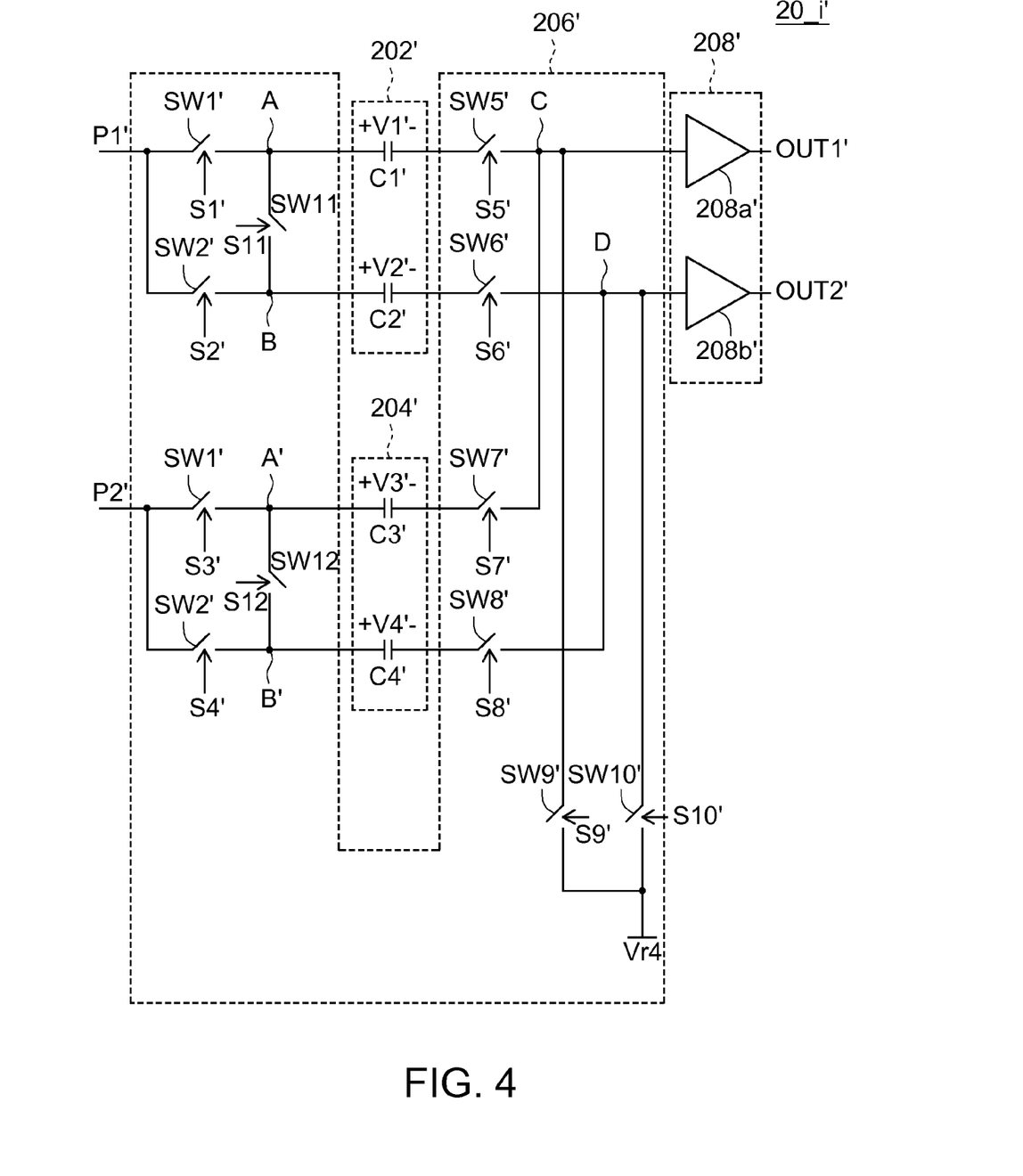
FIG. 4 is a circuit diagram showing a CDS circuit according to a second embodiment of the invention.
Figure 5:
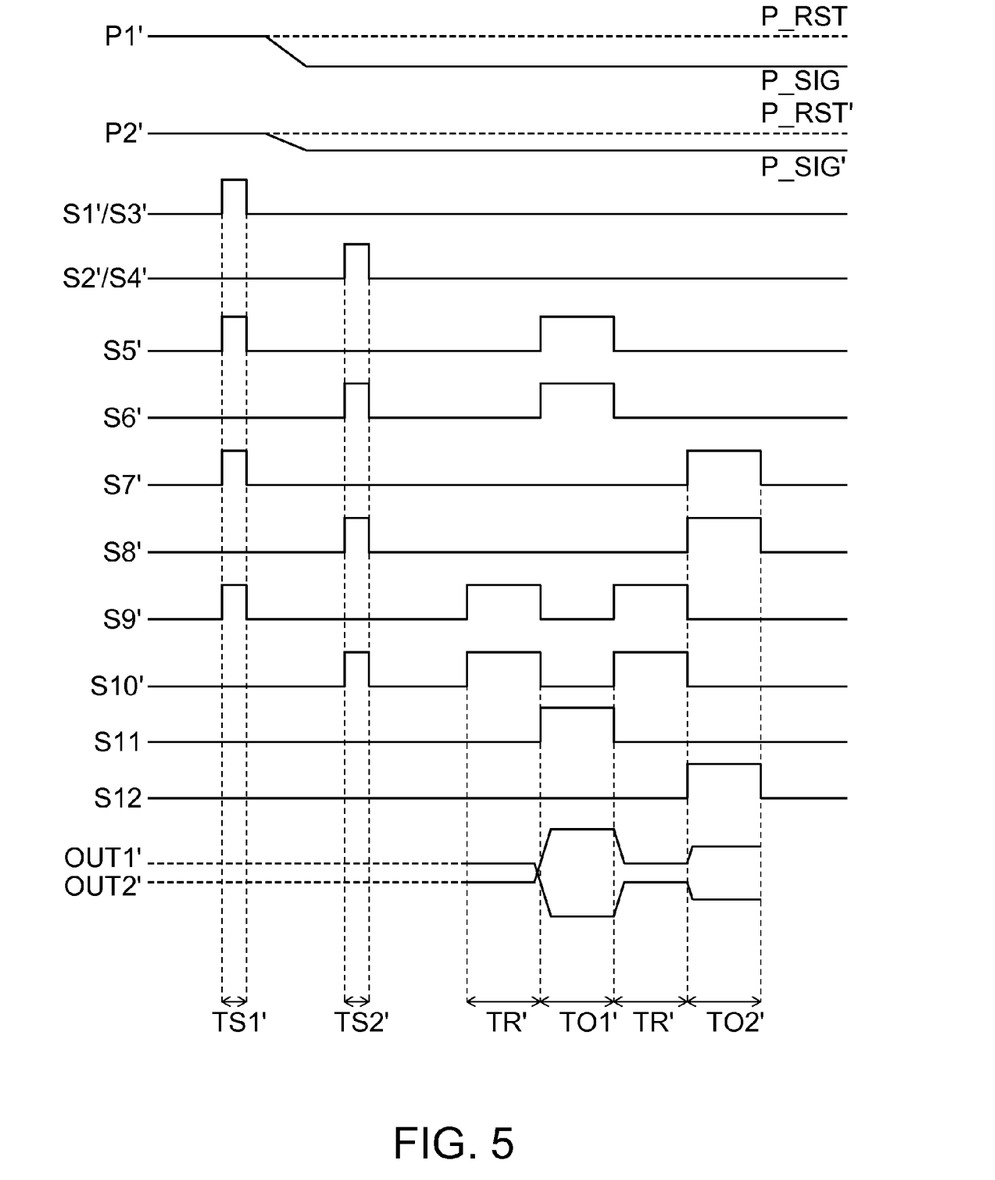
FIG. 5 shows associated signal waveforms for the CDS circuit of FIG. 4.

FIG. 4 is a circuit diagram showing a CDS circuit according to a second embodiment of the invention. FIG. 5 shows associated signal waveforms for the CDS circuit of FIG. 4. Different from the first embodiment, the levels at two terminals of the sampling capacitors C1' to C4' of the sampling circuits 202' and 204' according to the second embodiment are provided by the control circuit 206'. The control circuit 206' further provides a reference voltage Vr4 to the sampling capacitors C1' to C4' in the corresponding sampling periods.

More specifically, the switches SW5', SW7' and SW9' are respectively turned on in response to the control signals S5', S7' and S9' in the sub-scan period TS1' in order to form a short-circuited path for providing the reference voltage Vr4 to the first terminals of the sampling capacitors C1' and C3'. Consequently, the sampling capacitors C1' and C3' respectively obtain, by way of sampling, the sampling voltage V1' between the reset level P_RST of the pixel signal P1' and the reference voltage Vr4, and the sampling voltage V2' between the reset level P_RST' of the pixel signal P2' and the reference voltage Vr4.

Similarly, the switches SW6', SW8' and SW10' are respectively turned on in response to the control signals S6', S8' and S10' in the sub-scan period TS2' to form a short-circuited path for providing the reference voltage Vr4 to the first terminals of the sampling capacitors C2' and C4'. Consequently, the sampling capacitors C2' and C4' respectively obtain, by way of sampling, the sampling voltage V3' between the data level P_SIG'D1' of the pixel signal P1' and the reference voltage Vr4, and the sampling voltage V4' between the data level P_SIG'LD2' of the pixel signal P2' and the reference voltage Vr4.

The control circuit 206' of this embodiment further includes a switch SW11, which is turned on in response to a control signal S11 in the corresponding level shifting period so that the first terminals of the sampling capacitors C1' and C2' have the same voltage levels. In one example, it is assumed that the voltage VA at the node A is the reset level P_RST, the voltage VB at the node B is the signal level P_SIG, the voltage VC at the node C is Vr4, and the voltage VD at the node D is Vr4 after the sampling procedure. In this case, if the switch SW11 is turned on, the charges in the capacitors C1' and C2' are re-distributed, and the voltages VA and VB at the nodes A and B satisfy:

$$VA = VB = \frac{1}{2}(\text{P\_RST} + \text{P\_SIG})$$

the voltages VC at the node C and the voltage VD at the node D respectively satisfy:

$$VC = Vr4 - \frac{1}{2}(\text{P\_RST} - \text{P\_SIG})$$

$$VD = Vr4 - \frac{1}{2}(\text{P\_SIG} - \text{P\_RST})$$

Thus, after the switch SW11 is enabled, an absolute value ABS(VC-VD) of the voltage difference between the voltages VC and VD at the nodes C and D satisfies:

$$\begin{aligned}\text{ABS}(VC - VD) &= |VC - VD| \\ &= \left|Vr4 - \frac{1}{2}(\text{P\_SIG} - \text{P\_RST}) - \left\{Vr4 - \frac{1}{2}(\text{P\_RST} - \text{P\_SIG})\right\}\right| \\ &= |\text{P\_RST} - \text{P\_SIG}|\end{aligned}$$

That is, the absolute value of the voltage difference between the voltages VC and VD at the nodes C and D is equal to the absolute value of the original voltage difference between the voltages at nodes A and B. In other words, the absolute value ABS(VC-VD) of the voltage difference of the amplifier circuit 208', provided by the control circuit 206' of this embodiment, is substantially equal to the absolute value of the difference voltage between the reset level P_RST and the signal level P_SIG, but the levels of the voltages VC and VD at the nodes C and D have been adjusted. At this time, the adjusted voltages VC and VD at the nodes C and D are provided to the amplifier circuit 208' and are correspondingly outputted.

Similarly, the control circuit 206' of this embodiment further includes a switch SW12. The operation of the switch SW12 is similar to that of the switch SW11 so that the voltage difference between the voltages VC and VD at the nodes C and D is equal to the voltage difference between the reset level P_RST' and the signal level PP_SIG'. Herein, the detailed operation thereof will be omitted.

Consequently, the CDS circuit 20_i' of this embodiment can effectively adjust the level of the signal provided to the amplifier circuit 208' through the operations of the switches SW9 to SW12.

In this illustrated embodiment, the turned-on switch SW11 is coupled to the first terminals of the sampling capacitors C1' and C2' via the short-circuited path, and the turned-on switch SW12 is coupled to the first terminals of the sampling capacitors C3' and C4' via the short-circuited path in the corresponding level shifting period so that the first terminals of the capacitors C1' and C2' and the first terminals of the capacitors C3' and C4' have the same voltage. However, the CDS circuit of this embodiment is not limited thereto.

In another example, it is also possible to couple the first terminals of the sampling capacitors C1' and C2' to a reference level through the switch simultaneously. Thus, it is also possible to make the first terminals of the sampling capacitors C1' and C2' have the same voltage level. Similarly, it is also possible to couple the first terminals of the sampling capacitors C3' and C4' to the reference level through the corresponding switch simultaneously so that the first terminals of the sampling capacitors C3' and C4' have the same voltage level.

The CDS circuit of this embodiment may also have several sampling circuits for sampling the corresponding pixel signals in the corresponding sampling periods. The CDS circuit of this embodiment may also respectively control these sampling circuits to output the correspondingly sampled levels via the amplifier circuit through the control circuit in many output periods. Thus, compared with the conventional CDS circuit, the CDS circuit of the invention also has the advantage of the smaller circuit area.

In the illustrated embodiments of the invention, the output signals of the CDS circuit have the output signal waveforms OUT1 and OUT2 and the output signal waveforms OUT1' and OUT2' shown in FIGS. 3 and 5. However, only several outstanding examples of the CDS circuits according to the invention are provided, and the actual waveforms of the output signals of the CDS circuits are not limited thereto and may vary according to the actual condition.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A correlated double sampling (CDS) circuit for sampling a first pixel signal, transmitted via a first data line, and a second pixel signal, transmitted via a second data line, in a pixel array, the CDS circuit comprising:
   a first sampling circuit and a second sampling circuit;
   an amplifier circuit; and
   a control circuit for controlling the first sampling circuit to sample a first reset level and a first data level of the first pixel signal in a first sampling period, and for controlling the second sampling circuit to sample a second reset level and a second data level of the second pixel signal in a second sampling period,
   wherein the control circuit is further for controlling the amplifier circuit to output a first sampling reset level and a first sampling data level sampled by the first sampling circuit in a first output period, and to output a second sampling reset level and a second sampling data level sampled by the second sampling circuit in a second output period.

2. The CDS circuit according to claim 1, wherein the first and second sampling circuits respectively comprise:
   a first sampling capacitor and a second sampling capacitor for sampling the first reset level in a first sub-period of the first sampling period, and sampling the first data level in a second sub-period of the first sampling period, respectively; and
   a third sampling capacitor and a fourth sampling capacitor for sampling the second reset level in a third sub-period of the second sampling period, and sampling the second data level in a fourth sub-period of the second sampling period, respectively.

3. The CDS circuit according to claim 2, wherein the control circuit comprises:
   a first switch and a second switch, wherein first input terminals of the first and second switches are coupled to the first data line, second input terminals of the first and second switches are respectively coupled to a first terminal of the first sampling capacitor and a first terminal of the second sampling capacitor, and the first and second switches are turned on in the first and second sub-periods, respectively; and
   a third switch and a fourth switch, wherein first input terminals of the third and fourth switches are coupled to the second data line, second input terminals of the third and fourth switches are respectively coupled to a first terminal of the third sampling capacitor and a first terminal of the fourth sampling capacitor, and the third and fourth switches are turned on in the third and fourth sub-periods, respectively.

4. The CDS circuit according to claim 3, wherein:
   the amplifier circuit comprises a first amplifier and a second amplifier;
   the control circuit further comprises a fifth switch and a sixth switch, wherein first input terminals of the fifth and sixth switches are respectively coupled to input terminals of the first and second amplifiers, second input terminals of the fifth and sixth switches receive a reference voltage, and the fifth and sixth switches are for providing the reference voltage to the input terminals of the first and second amplifiers in a reset period; and
   the reset period is triggered before the first and second output periods, and the reset period and the first and second output periods are non-overlapped.

5. The CDS circuit according to claim 4, wherein the control circuit further comprises:
   a seventh switch and an eighth switch, wherein first input terminals of the seventh and eighth switches are respectively coupled to the first terminals of the first and second sampling capacitors, second input terminals of the seventh and eighth switches are respectively coupled to the input terminals of the first and second amplifiers, and the seventh and eighth switches are turned on in the first output period; and
   a ninth switch and a tenth switch, wherein first input terminals of the ninth and tenth switches are respectively coupled to the first terminals of the third and fourth sampling capacitors, and second input terminals of the ninth and tenth switches are respectively coupled to the input terminals of the first and second amplifiers, and the ninth and tenth switches are turned on in the second output period.

6. The CDS circuit according to claim 4, wherein the control circuit further comprises:
a seventh switch and an eighth switch, wherein first input terminals of the seventh and eighth switches are respectively coupled to second terminals of the first and second sampling capacitors, and second input terminals of the seventh and eighth switches are respectively coupled to the input terminals of the first and second amplifiers, and the seventh and eighth switches are turned on in the first output period; and
a ninth switch and a tenth switch, wherein first input terminals of the ninth and tenth switches are respectively coupled to second terminals of the third and fourth sampling capacitors, second input terminals of the ninth and tenth switches are respectively coupled to the input terminals of the first and second amplifiers, and the ninth and tenth switches are turned on in the second output period.

7. The CDS circuit according to claim 6, wherein:
the fifth and seventh switches are further turned on in the first sub-period to provide the reference voltage to a second terminal of the first sampling capacitor;
the sixth and eighth switches are further turned on in the second sub-period to provide the reference voltage to a second terminal of the second sampling capacitor;
the fifth and ninth switches are further turned on in the third sub-period to provide the reference voltage to a second terminal of the third sampling capacitor; and
the sixth and tenth switches are further turned on in the fourth sub-period to provide the reference voltage to a second terminal of the fourth sampling capacitor.

8. The CDS circuit according to claim 6, wherein the control circuit further comprises:
an eleventh switch for making the first terminals of the first and second sampling capacitors having the same voltage level in a first level shifting period; and
a twelfth switch for making the first terminals of the third and fourth sampling capacitors having the same voltage level in a second level shifting period.

9. The CDS circuit according to claim 2, wherein the first and third sub-periods are substantially the same operation period, and the second and fourth sub-periods are substantially the same operation period.

10. The CDS circuit according to claim 1, wherein the first and second data lines are different data lines.

11. A correlated double sampling (CDS) circuit for sampling a first pixel signal, transmitted via a first data line, and a second pixel signal, transmitted via a second data line, in a pixel array, the CDS circuit comprising:
an amplifier circuit;
a first sampling circuit, which comprises a first sampling capacitor and a second sampling capacitor, wherein first terminals of the first and second sampling capacitors receive a first reference voltage;
a second sampling circuit, which comprises a third sampling capacitor and a fourth sampling capacitor, wherein first terminals of the third and fourth sampling capacitors receive the first reference voltage; and
a control circuit, which comprises:
a first set of switches for respectively providing the first pixel signal, having a first reset level, and the first pixel signal, having a first data level, to second terminals of the first and second sampling capacitors in a first sampling period;
a second set of switches for respectively providing the second pixel signal, having a second reset level, and the second pixel signal, having a second data level, to second terminals of the third and fourth sampling capacitors in a second sampling period;
a third set of switches for coupling the second terminals of the first and second sampling capacitors to the amplifier circuit in a first output period, and thus outputting the first reset level, sampled by the first sampling capacitor, and outputting the first data level, sampled by the second sampling capacitor; and
a fourth set of switches for coupling the second terminals of the third and fourth sampling capacitors to the amplifier circuit in a second output period, and thus outputting the second reset level, sampled by the third sampling capacitor and outputting the second data level, sampled by the fourth sampling capacitor.

12. The CDS circuit according to claim 11, wherein:
the amplifier circuit comprises a first amplifier and a second amplifier;
the control circuit further comprises a fifth set of switches for providing a second reference voltage to input terminals of the first and second amplifiers in a reset period; and
the reset period is triggered before the first and second output periods, and the reset period and the first and second output periods are non-overlapped.

13. A correlated double sampling (CDS) circuit for sampling a first pixel signal, transmitted via a first data line, and a second pixel signal, transmitted via a second data line, in a pixel array, the CDS circuit comprising:
a first amplifier circuit and a second amplifier circuit;
a first sampling circuit, which comprises a first sampling capacitor and a second sampling capacitor;
a second sampling circuit, which comprises a third sampling capacitor and a fourth sampling capacitor; and
a control circuit, which comprises:
a first set of switches for respectively providing the first pixel signal, having a first reset level, and the first pixel signal, having a first data level, to first terminals of the first and second sampling capacitors in a first sampling period;
a second set of switches for respectively providing the second pixel signal, having a second reset level, and the second pixel signal, having a second data level, to first terminals of the third and fourth sampling capacitors in a second sampling period;
a third set of switches for coupling second terminals of the first and second sampling capacitors to the amplifier circuit in a first output period, and thus outputting the first reset level, sampled by the first sampling capacitor, and outputting the first data level, sampled by the second sampling capacitor; and
a fourth set of switches for coupling second terminals of the third and fourth sampling capacitors to the amplifier circuit in a second output period, and thus outputting the second reset level, sampled by the third sampling capacitor, and outputting the second data level, sampled by the fourth sampling capacitor.

14. The CDS circuit according to claim 13, further comprising:
a fifth set of switches for providing a reference voltage to input terminals of the first and second amplifiers in a reset period, wherein the reset period is triggered before the first and second output periods; and
the reset period, and the first and second output periods are non-overlapped.

15. The CDS circuit according to claim 14, wherein:

the third and fifth sets of switches are further turned on in the first sampling period to provide the reference voltage to the second terminals of the first and second sampling capacitors; and the fourth and fifth sets of switches are further turned on in the second sampling period to provide the reference voltage to the second terminals of the third and fourth sampling capacitors.

16. The CDS circuit according to claim 13, wherein the control circuit further comprises:

a sixth set of switches for making the first terminals of the first and second sampling capacitors have the same voltage level in a first level shifting period, and making the first terminals of the third and fourth sampling capacitors have the same voltage level in a second level shifting period.

* * * * *